(12) United States Patent
Breeden

(10) Patent No.: US 10,424,021 B2
(45) Date of Patent: Sep. 24, 2019

(54) COMPUTER IMPLEMENTED METHOD FOR ESTIMATING AGE-PERIOD-COHORT MODELS ON ACCOUNT-LEVEL DATA

(71) Applicant: Joseph L. Breeden, Santa Fe, NM (US)

(72) Inventor: Joseph L. Breeden, Santa Fe, NM (US)

(73) Assignee: DEEP FUTURE ANALYTICS, LLC, Santa Fe, NM (US)

( * ) Notice: Subject to any disclaimer, the term of this patent is extended or adjusted under 35 U.S.C. 154(b) by 0 days.

(21) Appl. No.: 13/998,068

(22) Filed: Sep. 27, 2013

(65) Prior Publication Data

US 2014/0114880 A1   Apr. 24, 2014

Related U.S. Application Data

(60) Provisional application No. 61/706,184, filed on Sep. 27, 2012.

(51) Int. Cl.
*G06Q 40/06* (2012.01)
*G06Q 30/02* (2012.01)

(52) U.S. Cl.
CPC ......... *G06Q 40/06* (2013.01); *G06Q 30/0202* (2013.01)

(58) Field of Classification Search
None
See application file for complete search history.

(56) References Cited

U.S. PATENT DOCUMENTS

| | | | |
|---|---|---|---|
| 8,271,367 B1* | 9/2012 | Classen | 705/35 |
| 2004/0039688 A1* | 2/2004 | Sulkowski et al. | 705/38 |
| 2005/0273430 A1 | 12/2005 | Pliha | |
| 2007/0208640 A1* | 9/2007 | Banasiak | G06Q 10/04 705/35 |
| 2009/0157482 A1 | 6/2009 | Jung et al. | |
| 2010/0293213 A1* | 11/2010 | Jiang et al. | 708/270 |

(Continued)

OTHER PUBLICATIONS

B. Carstensen, Age—period—cohort models for the Lexis diagram, Published online Dec. 18, 2006, Wiley InterScience, Statistics in Medicine Statist. Med. 2007; 26:3018-3045.*

*Primary Examiner* — Scott S Trotter
(74) *Attorney, Agent, or Firm* — Clark Hill PLC; John S. Paniaguas

(57) ABSTRACT

A computer-implemented method and invention for calculating a loan-level model with the age, period, and cohort functions found in the structure of an Age-Period-Cohort models. The invention uses one observation per account per time period, processed with a uniquely structured set of basis functions, so that the model may be estimated with either Generalized Linear Models (GLM) or Generalized Linear Mixed Models (GLMM). The model created by the invention may be used for account-level forecasting or stress testing of the defined performance variable if the historic extrapolation of the period function is detrended, the age and cohort functions are re-estimated appropriately, and a suitable scenario for the future of the period function. Scores may also be created by combining traditional scoring inputs with an account-level offset computed as the sum of the age and period functions at each time point.

13 Claims, 6 Drawing Sheets

(56) References Cited

U.S. PATENT DOCUMENTS

2011/0047058 A1* 2/2011 Erbey .................... G06Q 40/00
                                                    705/35
2011/0078073 A1* 3/2011 Annappindi ................ 705/38
2012/0198518 A1* 8/2012 Faith et al. .................. 726/2

* cited by examiner

COMPUTER IMPLEMENTED METHOD FOR ESTIMATING AGE-PERIOD-COHORT MODELS ON ACCOUNT-LEVEL DATA

CROSS REFERENCE TO RELATED APPLICATIONS

The present application claims priority to and the benefit of U.S. provisional application No. 61/706,184, filed on Sep. 27, 2012

COMPUTER APPENDIX

This application includes a Computer Listing Appendix on compact disc, hereby incorporated by reference.

BACKGROUND OF THE INVENTION

The present invention is in the technical field of data analysis and more particularly to a machine for estimating Age-Period-Cohort (APC), i.e. parametric, models from account-level observations of an event of interest.

SUMMARY OF THE INVENTION

The present invention relates to a machine implemented as a programmed computer for analyzing account-level information to estimate a model with the same structure (Eq. 1 and 2) as an APC model. In addition, the invention generalizes the estimation to allow for multiple link functions. This approach leverages recent developments in Generalized Linear Models (GLM) and Generalized Linear Mixed Models (GLMM) to create robust, account-level estimates of an APC-style model.

BRIEF DESCRIPTION OF THE DRAWINGS

These and other advantages of the present invention will be readily understood with reference to the following specification and attached drawing wherein.

DETAILED DESCRIPTION OF THE INVENTION

Figure 1A:
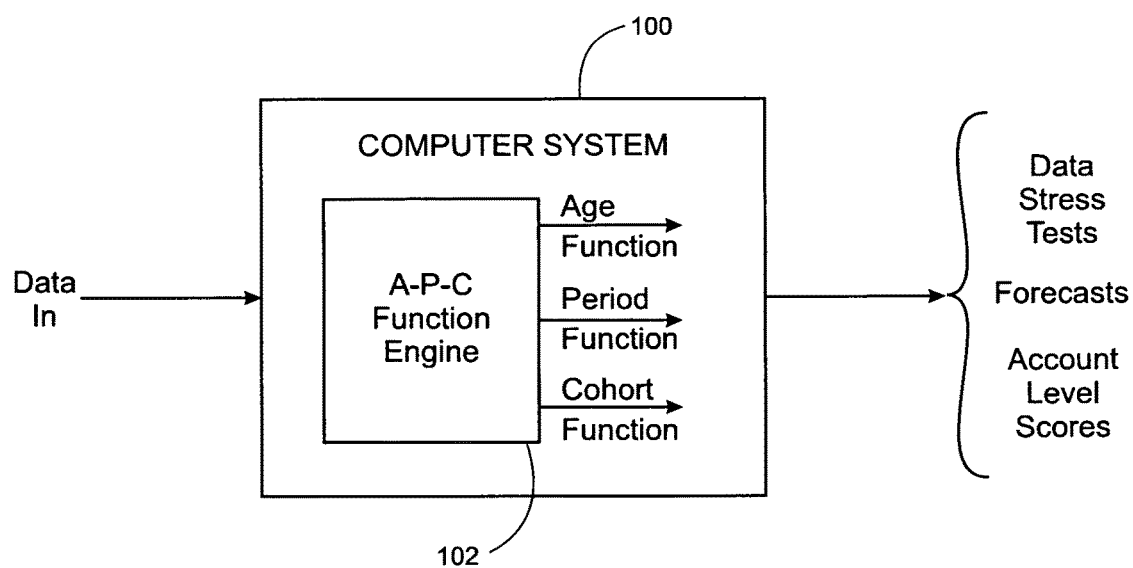
FIG. 1A is a block diagram of the machine in accordance with the present invention.

Before getting into the details of the invention, definitions for the terms below are provided.

"Account" refers to an ongoing relationship, such as between a web site and a user, or a lender and a borrower. The essential feature of an account for the present invention is that it provides for observation of the behavior of a consumer over time. As a counter-example, gas stations rarely have account relationships with their customers. They generally do not know all the gasoline purchases of a customer or even how often that customer purchases gas at their station.

"Event" refers to any observable activity for an account. Events are often terminal activities such that the account is closed after occurrence of the Event. Examples of terminal events include loan default, voluntary account closure by the consumer, death, bankruptcy. Non-terminal events may also be modeled and include such things as taking a cash advance on a credit card, placing an international call with a mobile phone, account activation, account delinquency, and even anomalous situations of multiple defaults or multiple bankruptcy filings.

As mentioned above, the present invention relates to a machine for estimating Age-Period-Cohort (APC) models for various data, such as account data, in order to predict the behavior of the accounts. Such APC models are known in the art and relate to a class of statistical models for various demographic rates, for example, mortality, morbidity and other demographic rates observed over a broad age range over a significant amount of time. Typically, an APC model is classified by age and date of follow-up (period) and date of birth (cohort). As applied to account data: "Age" refers to the age of the account, "Period" refers to the observation date for the event, and "Cohort" refers to the date on which the account was originated. All accounts originated on that date are referred to collectively as a Cohort. APC models are estimated on aggregate data by cohort.

TABLE 1

Data structure required by Age-Period-Cohort Algorithm

| Cohort | Period | Number of Events | Number of Accounts |
|---|---|---|---|
| ... | ... | ... | ... |
| January 2008 | March 2009 | 0 | 323 |
| January 2008 | April 2009 | 2 | 323 |
| January 2008 | May 2009 | 1 | 323 |
| ... | ... | ... | ... |
| October 2008 | March 2009 | 3 | 415 |
| October 2008 | April 2009 | 1 | 415 |
| ... | ... | ... | ... |

The time interval for the data can be any regular increment: day, month, year, etc. When the data has few events, as in Table 1, the estimation of the APC model will be quite noisy. The APC is essentially modeling a rate formed by taking "Number of Events" as the numerator and "Number of Accounts" as the denominator. The user may define both of those as needed. The estimation process uses an additive link function, so the algorithm is not "generalized" to multiple link functions as in Generalized Linear Models.

The result of the APC estimation will be three functions: an Age function; a Period function, and Cohort function having the form as set forth below:

Rate(cohort,period)=Age.func(age)+Period.func(period)+Cohort.func(cohort)+residual(cohort, period)   (1)

The historical rate data is Number of Events(cohort, period)/Number of Accounts(cohort, period). The value of age is derived from age=period−cohort   (2)

The three functions may be estimated parametrically by way of a general purpose computer programmed as described herein, typically using a set of orthogonal basis functions, such as Chebyshev polynomials, or spline functions. Whichever basis is used must include an explicit linear term so that it may be controlled via a constraint. Because of Eq. 2, of these three functions, only one function may include a constant term and only two may include linear terms in order to avoid having model specification errors. Many alternatives exist for specifying the linear terms, but all require having an explicit control on the coefficient of the linear term in the basis functions.

Figure 3:
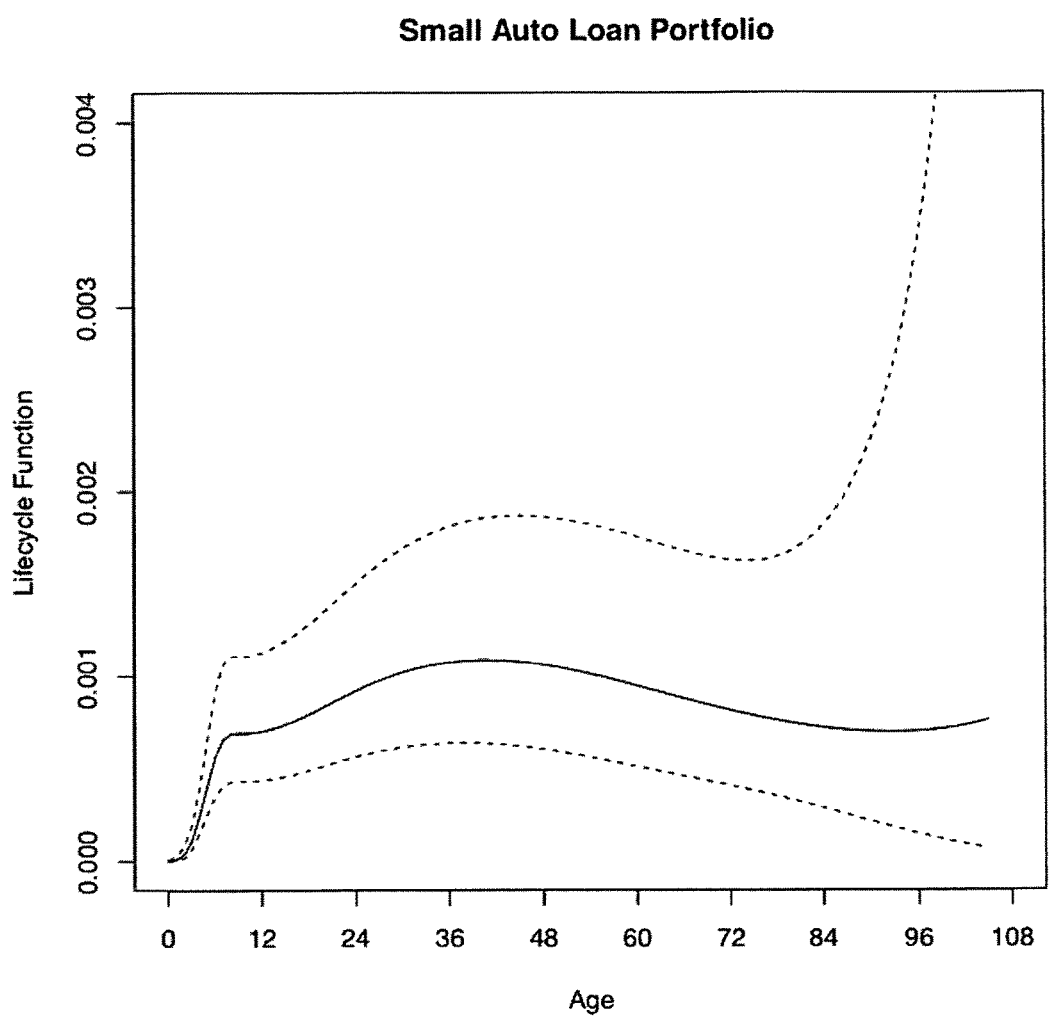
FIG. 3 is the Age.func(age) for an exemplary data set
Figure 4:
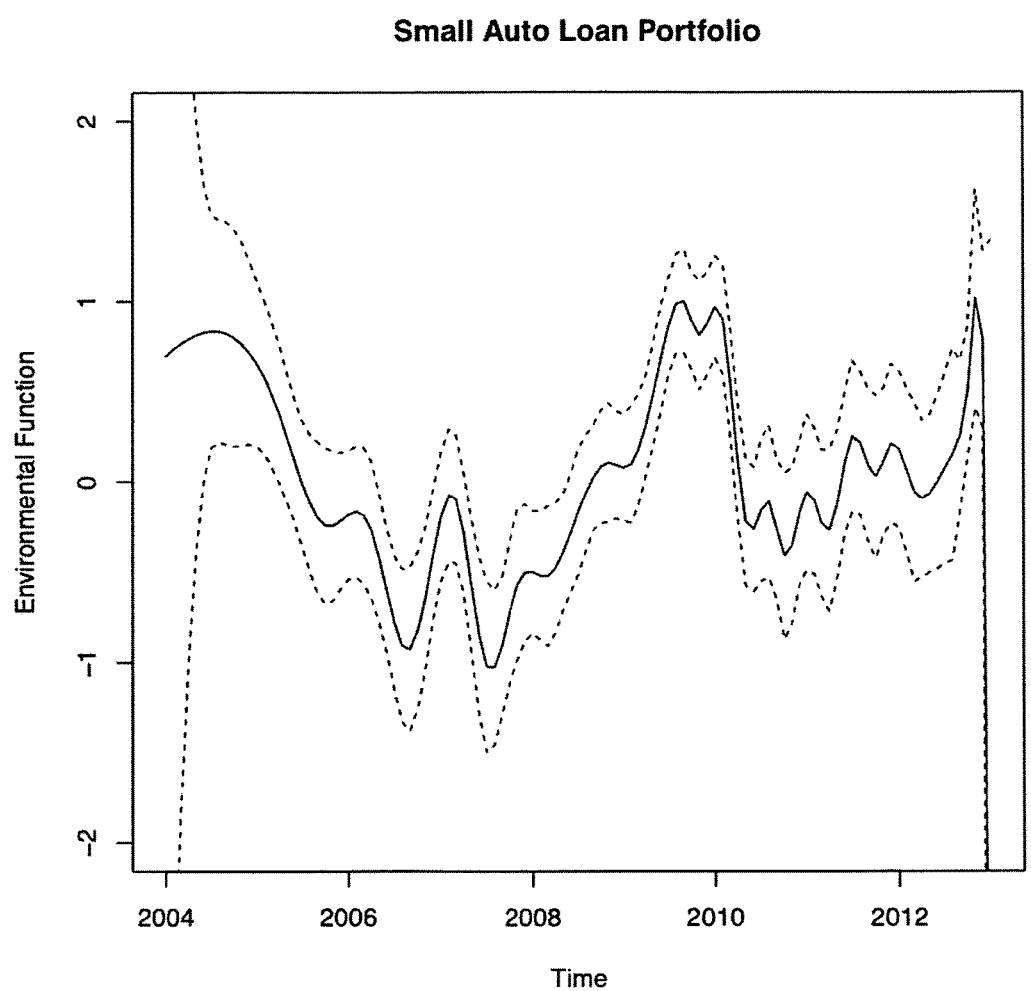
FIG. 4 is the Period.func(period) for an exemplary data set
Figure 5:
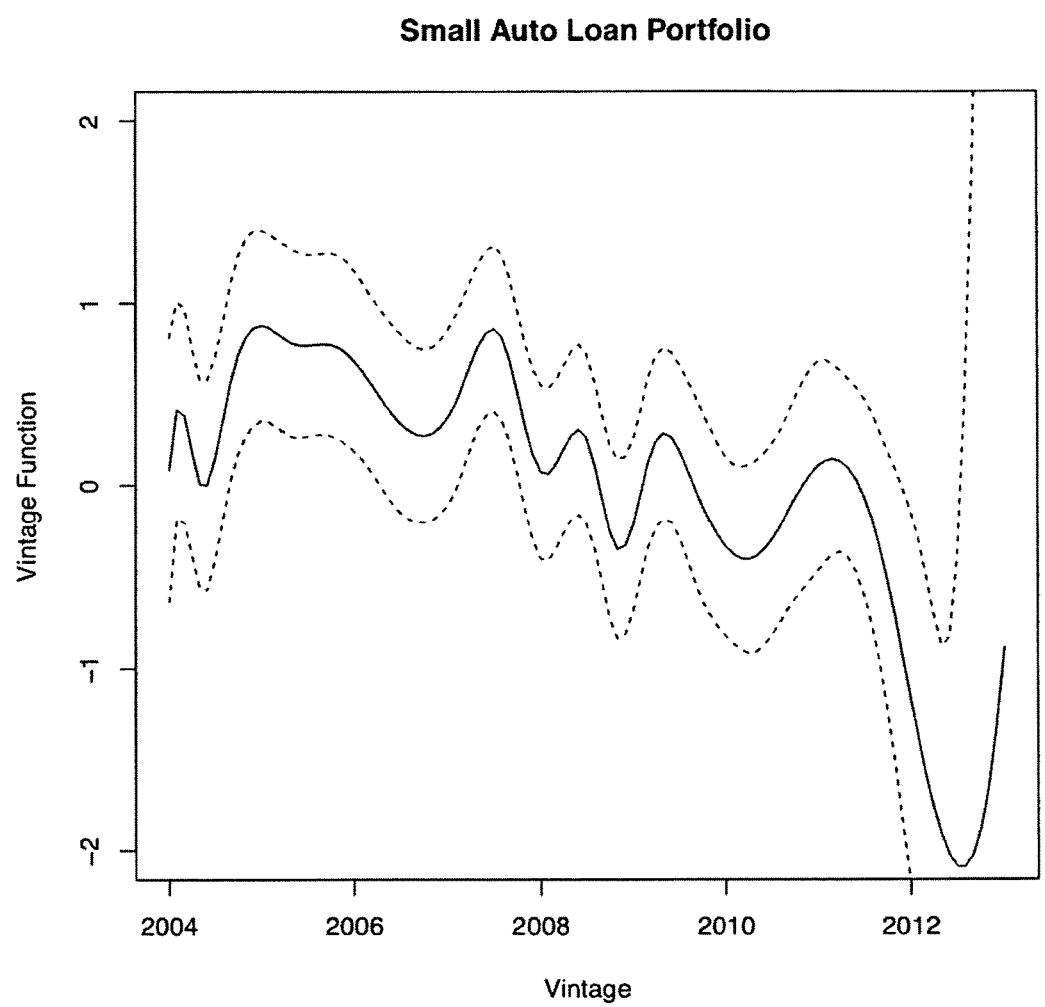
FIG. 5 is the Cohort.func(cohort) for an exemplary data set

With reference to FIG. 1A, the machine in accordance with the present invention includes a computer system 100. The computer system 100 includes a general purpose computer and various persistent and non-persistent storage. The general purpose computer 100 is programmed with an A-P-C engine 102 that processes various data, such as account data, and determines the Age function, the Period function and the Cohort function. FIG. 3 illustrates an exemplary Age.func(age) for an exemplary data set. FIG. 4 illustrates an exemplary Period.func(period) for an exemplary data set while FIG. 5 illustrates an exemplary Cohort.func(cohort) for an exemplary data set. In each of FIGS. 3-5, the solid line represents the A-P-C function while the dotted lines represent the data.

Figure 1B:
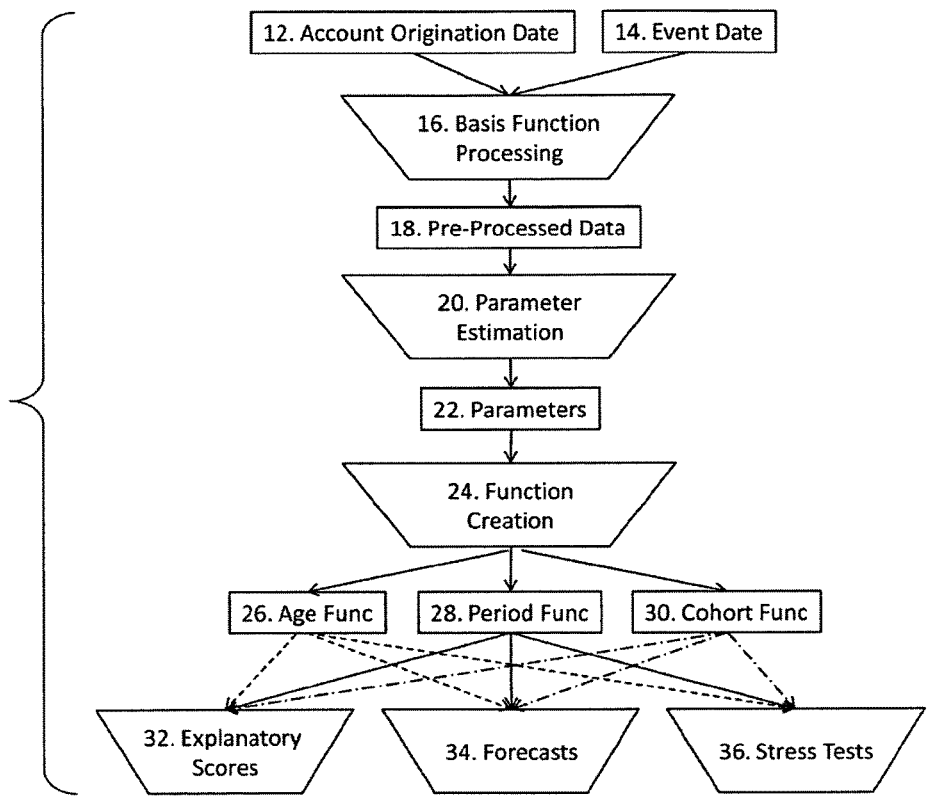
FIG. 1B is a flow diagram of the method of the present invention.

An exemplary flow chart for the general purpose computer is illustrated in FIG. 1B. As indicated by blocks 12 and 14, the minimum necessary input data in order to determine the A-P-C functions is the account origination data 12 and event data 14. Table 1 above illustrates exemplary input data to the computer system 100. As shown in Table 1, the data includes cohort data, period data, event data and the number of accounts. This data 12 and 14 is transformed 16 to a format suitable for analysis, for example, as illustrated in Table 2, below by way of basis function processing, as indicated by the block 16. This is accomplished by modifying the input data file from that shown in Table 1 to that shown in Table 2 via a computer implemented basis function process 16.

The estimation method begins by taking the required input data items Account Origination Date 12 and Event Date 14. One pair of items is required for each account. The computer system 100 computes basis functions, one function for each of age, period, and cohort. The basis function process 16 produces a new derived data set 18 containing the input data processed via the basis functions. A computer implemented basis parameter estimation process 20 estimates the basis function parameters 22 needed to produce the age, period, and cohort functions. A computer implemented function creation process 24 combines the basis functions 18 and parameters 22 to create the final age, period, and cohort functions, 26, 28, & 30. Those functions can be used in any of at least three different ways. These processes are discussed in more detail below.

The basis function process causes each account to be listed separately with a performance outcome for that month. If discrete events are being modeled, the Performance variable will be 0 or 1. If a continuous variable like mobile phone minutes used in a month, are being modeled, the performance would have the actual number. In particular, the input is transformed to values of the basis function via basis function process 16. If a Chebyshev polynomial is used, then Eq. 1 is transformed to $$prob_i(a, p, c) = \exp\left(\alpha_0 + \alpha_1 a + \sum_{j=2}^{N_a-1} \alpha_j O_j(a) + \right.$$ Eq. 3

-continued
$$\left. \sum_{j=2}^{N_p-1} \beta_j O_j(p) + \gamma_1 c + \sum_{j=2}^{N_c-1} \gamma_j O_j(c) + u_i \right)$$

where $prob_i$ is the probability of occurrence of the Event for the ith account, a is the age of that account in cohort c at period p. $u_i$ is an optional random effects term that adjusts for the fact that each account is observed multiple times, once for each period in which it is considered an open account.

$\alpha$, $\beta$, and $\gamma$ are the coefficients of the polynomials, $O_j$, which will be estimated. In Eq. 3, an age function consisting of a coefficients for constant, linear, and polynomial terms consistent with a Chebyshev formulation of order $N_a$ is shown. The $\beta$ terms identify the period function, which contains only linear and polynomial terms up to order $N_p$. The $\gamma$ terms are for the cohort function which contains only polynomial terms up to order $N_c$, excluding constant and linear terms. This formulation avoids any model specification errors. The allocation of the linear trend can be done via post-processing according to any of the commonly known rules in APC models in computer implemented function creation process 24.

TABLE 2

Input data structure required for the present invention

| Acct No. | Cohort | Period | Events |
|---|---|---|---|
| ... | ... | ... | ... |
| 1001 | January 2008 | March 2009 | 0 |
| 1001 | January 2008 | April 2009 | 0 |
| 1001 | January 2008 | May 2009 | 1 |
| ... | ... | ... | ... |
| 3001 | October 2008 | March 2009 | 0 |
| 3001 | October 2008 | April 2009 | 0 |
| ... | ... | ... | ... |

As indicated by block 18, the data is then prepared for parameter estimation incorporating an assumption on linear trend allocation using basis functions. In the case of Eq. 3, the Period function is assumed to have no linear trend by removing any linear terms. The parameters are estimated via a Generalized Linear Model (GLM) or a Generalized Linear Mixed Model (GLMM) algorithm 20. GLMs and GLMMs are well known in the art. GLMs are described in detail in "Introduction to Generalized Linear Models, by Heather Turner, ESRC National Centre for Research Methods, UK and Department of Statistics, University of Warwick UK, Copyright 2008. GLMMs are described in detail in Breslow, N. E.; Clayton, D. G. (1993). "*Approximate Inference* in Generalized Linear Mixed Models". *Journal of the American Statistical Association* 88 (421): 9-25. doi:10.2307/2290687, both hereby incorporated by reference.

TABLE 3

Input data after being transformed by Eq. 3 for parameter estimation.

| Acct No. | O0.a | O1.a | O2.a ... O[Na].a | O2.p ... O[Np].p | O1.c | O2.c ... O[Nc].c | Events |
|---|---|---|---|---|---|---|---|
| ... | ... | ... | ... | ... | ... | ... | ... |
| 1001 | 1 | 14 | ... | ... | 6 | ... | 0 |
| 1001 | 1 | 15 | ... | ... | 6 | ... | 0 |
| 1001 | 1 | 16 | ... | ... | 6 | ... | 1 |
| ... | ... | ... | ... | ... | ... | ... | ... |

TABLE 3-continued

Input data after being transformed
by Eq. 3 for parameter estimation.

| Acct No. | O0.a | O1.a | O2.a ... O[Na].a | O2.p ... O[Np].p | O1.c | O2.c ... O[Nc].c | Events |
|---|---|---|---|---|---|---|---|
| 3001 | 1 | 6 | ... | ... | 7 | ... | 0 |
| 3001 | 1 | 7 | ... | ... | 7 | ... | 0 |
| ... | ... | ... | ... | ... | ... | ... | ... |

The input data file becomes that shown in Table 3 (element 18 of the flow diagram) so that the $\alpha$, $\beta$, and $\gamma$ coefficients can be estimated with a standard GLM algorithm (excluding the $u_i$ term), or GLMM algorithm (including the $u_i$ term). When the coefficients are estimated, we choose the appropriate distribution (binomial for terminal Events, log-normal for continuous positive performance measures, etc.) and link function (logit is most common for terminal Events).

Eq. 3 could equally well be implemented with spline functions or non-parametric functions with a total of one constant term and two linear terms. In both of these latter cases, the trend component would be removed by computer processing of the parameters for the modified version of Table 3 via a QR decomposition. QR decomposition allows the parameter estimation to control the trend estimation similarly to what was shown above.

Once all the parameters in Eq. 3 have been estimated via the computer system 100, as indicated by block 20, the A-P-C functions 26, 28 and 30 are created via a parameter estimation process 24. More particularly, the estimated parameters 22 are combined with the basis functions 24 to create the Age, Period, and Cohort functions 26, 28, & 30. The functions are created by grouping terms in age, period, and cohort into the corresponding functions.

For the example in Eq. 3 in which orthogonal basis functions were employed, the corresponding functions are created as:

$$\text{Age.} func(a) = \alpha_0 + \alpha_1 a + \sum_{j=2}^{N_a-1} \alpha_j O_j(a)$$

$$\text{Period.} func(p) = \sum_{j=2}^{N_p-1} \beta_j O_j(p)$$

$$\text{Cohort.} func(c) = \gamma_1 c + \sum_{j=2}^{N_c-1} \gamma_j O_j(c)$$

The A-P-C functions illustrated above may then be used to create explanatory scores of loan performance via the computer implemented scoring process 32. In addition, these functions may be used to predict future performance via the computer implemented forecasting process 34 for the individual accounts by providing a scenario for future values of the Period.func(period). By including extreme scenarios, the functions may be used for predicting stressed account performance, e.g. stress testing via the computer implemented stress testing process 36.

For example, the Federal Reserve's CCAR stress testing process provides scenarios of extreme macroeconomic stress to lenders. The variables in those scenarios would be correlated historically via a regression model to the historic Period.func(p). The CCAR process provides three alternative scenarios for future economic conditions. Each of those can be used to create distinct scenarios for the Period.func(p) out-of-time. When combined with the Age.func(a) and Cohort.func(c), a three complete stress tests are created.

As such, the APC functions are used to create account-level scores 32, forecasts 34, or stress tests 36. The present invention provides a mechanism for computer estimation of the functions Age.func(age), Period.func(period), and Cohort.func(cohort) using account-level data, while still maintaining the constraints on the linear trend components of those functions.

In computer implemented explanatory scoring process 32, explanatory scores are created from the age, period, and cohort functions with the addition of account-level scoring factors. A GLM or GLMM model may be created from the data in Table 4.

TABLE 4

Input data for explanatory score estimation including
an offset derived from the Age.func(a) + Period.func(p)
and additional scoring factors X.

| Acct No. | offset | X1 ... | XN ... | Events |
|---|---|---|---|---|
| ... | ... | ... | ... | ... |
| 1001 | os(a, p) | x1(i) | xN(i, p) | 0 |
| 1001 | os(a, p) | x1(i) | xN(i, p) | 0 |
| 1001 | os(a, p) | x1(i) | xN(i, p) | 1 |
| ... | ... | ... | ... | ... |
| 3001 | os(a, p) | x1(i) | xN(i, p) | 0 |
| 3001 | os(a, p) | x1(i) | xN(i, p) | 0 |
| ... | ... | ... | ... | ... |

In Table 4, the columns necessary for the execution of computer implemented scoring process 32 are shown. The offset for each row is computed as offset(age, period) =Age.func(age)+Period.func(p). The columns X may be information for Acct No. i that is fixed throughout, as shown in X1, or may be time-varying for the observation period, as shown in XN. Any number of columns of scoring data may be included. Once the offset column has be properly computed and included, the scoring may proceed as normal.

Optionally, computer implemented forecasting process 34 creates forecasts for the accounts from the age, period, and cohort functions. Optionally, computer implemented stress testing process 36 creates stress tests from the age, period, and cohort functions.

The computer implemented scoring process 32, computer implemented forecasting process 34 or the computer implemented stress testing process 36 may require the use of macro-economic data for the creation of scenarios. To create a stable regression model predicting the Period.func from macroeconomic data requires adjustment for the fact that the linear trend is ambiguous. Although the expression in Eq. 3 creates a unique parameter estimation by making an assumption on the allocation of the linear trend, that assumption may not be correct when macroeconomic data is included. The regression model must therefore take the form $$\text{Period.} func(p) \sim E(p) + gp + \varepsilon(p) \qquad \text{Eq. 4}$$

$$\sim \sum_{j=1}^{n} c_j \cdot E_j(p) + gp + \varepsilon(p)$$

In Eq. 4, E(p) is an environmental index created from the fit to macroeconomic data. Ej(p) are the observed value of the jth macroeconomic time series, n time series in all. g is the coefficient for the linear trend required to best fit the macroeconomic data to the period function.

The coefficients in Eq. 4 may be fit via a computer implementation of an ordinary least squares regression algorithm or other algorithm providing a similar solution. However, most practitioners have relatively short data sets, such as 5 to 10 years in length. To get a truly stable estimate of the parameters in Eq. 4, longer histories are beneficial. As part of the current invention, after estimating Eq. 4 for the period function estimated for the event data, the environment index, E(p), may be further stabilized.

Using older macroeconomic data, the period function may be extrapolated backward through previous macroeconomic environments using the coefficients estimated in Eq. 4. A straight line is fit through the extrapolated environmental index and any trend removed.

$$E(p) \sim ap+b+e(p) \quad (5)$$

In Eq. 5, a and b are the slope and intercept terms for a straight line, respectively. e(p) is the error term.

$$E'(p)=E(p)-ap+b \quad (6)$$

Eq. 6 shows the calculation of the detrended environmental index E'(p). The detrended environmental index represents the best guess of what the long term macroeconomic impacts on the probability of event should be. As such, it is a unique solution to the linear trend ambiguity described earlier. To use E'(p) in the APC estimation, the linear components of the age and cohort functions can be adjusted to compensate, or the estimation of Eq. 3 can be modified to insert E'(p) as a fixed input.

$$prob_i(a, p, c) = \quad \text{Eq. 7}$$

$$\exp\left(\alpha_0 + \alpha_1 a + \sum_{j=2}^{N_a-1} \alpha_j O_j(a) + E'(p) + \gamma_1 c + \sum_{j=2}^{N_c-1} \gamma_j O_j(c) + u_i\right)$$

After estimating Eq. 7, all of the rest of computer implemented processes 32 through 36 may proceed as described previously.

Figure 2:
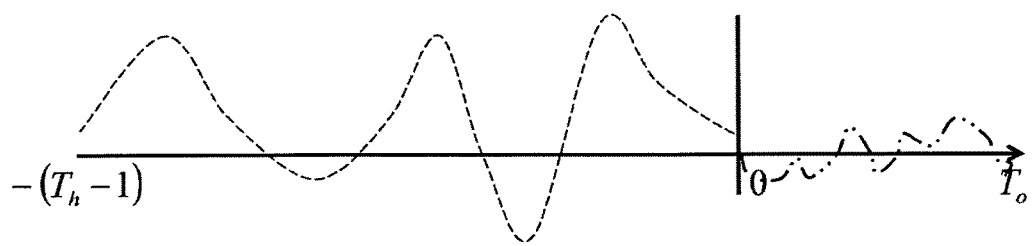
FIG. 2 is a time series plot of stabilizing the environmental trend for the present invention.

Referring now in detail to FIG. 2 computer implemented stress testing process 36 is illustrated. The original function is shown as the dot-dot-dash line, estimated over the event data from period 0 to T. The dash line is the detrended environment index shown backward extrapolated over the macroeconomic history from −Th to 0 and fit to the Period.func between 0 and T. The solid line represents when the original Period.func would look like with the linear trend adjustment suggested by E'(p).

The procedures represented in Eqs. 4-7 may be performed via constraints. Eq. 4 could be estimated directly with the constraint that the environment index E(p) show no net trend when extrapolated over prior economic periods. Similarly, the estimation of Eq. 3 could include the constraint that $$\beta_1 p + \sum_{j=2}^{N_p-1} \beta_j O_j(p)$$

exhibit no net trend when extrapolated over prior macroeconomic periods.

The advantages of the present invention include, without limitation, the ability to create account-level estimates of an APC model where previously all estimates have been on aggregate data. This invention has the advantage over standard GLM and GLMM implementations that an appropriate structure has been imposed so that the functions Age.func (age), Period.func(period), and Cohort.func(cohort) are estimated in a stable and unique way. In addition, this invention generalizes APC models to allow for a greater range of distributions and link functions so that they may be applied to a broader range of problems. This invention provides the ability to make account-level forecasts and stress tests using the full robustness of the Age-Period-Cohort structure.

The present invention has the additional advantage that explanatory scores as created in computed implemented scoring process 32 may be estimated such that they are normalized for changes in the age and period for the account. The use of the offset is unique in the context of scoring and provides improved robustness and fidelity.

The present invention also has the additional advantages in the context of forecasting and stress testing of creating a stable extrapolation over long periods of time. In the context of credit risk stress testing and Basel II risk capital, this provides a robust estimation of through-the-cycle probabilities where previous methods. In the context of credit scoring, this invention creates stable scores that do not need to be re-estimated frequently, as is the case for traditional scores.

EXAMPLE

The following example serves to illustrate the preceding process. Table 5 is a sample of the data to be analyzed. This data is the combined data for input data 12 & 14.

TABLE 5

The first 35 rows of a one million row data set.

| Loan.ID | Vintage.Date | Date | Co.Flg |
|---|---|---|---|
| 6834257L5 | February 2004 | February 2004 | 0 |
| 6834257L5 | February 2004 | March 2004 | 0 |
| 6834257L5 | February 2004 | April 2004 | 0 |
| 6834257L5 | February 2004 | May 2004 | 0 |
| 6834257L5 | February 2004 | June 2004 | 0 |
| 6834257L5 | February 2004 | July 2004 | 0 |
| 6834257L5 | February 2004 | August 2004 | 0 |
| 6834257L5 | February 2004 | September 2004 | 0 |
| 6834257L5 | February 2004 | October 2004 | 0 |
| 6834257L5 | February 2004 | November 2004 | 0 |
| 6834348L5 | June 2004 | June 2004 | 0 |
| 6834348L5 | June 2004 | July 2004 | 0 |
| 6834348L5 | June 2004 | August 2004 | 0 |
| 6834348L5 | June 2004 | September 2004 | 0 |
| 6834348L5 | June 2004 | October 2004 | 0 |
| 6834348L5 | June 2004 | November 2004 | 0 |
| 6834649L5.7 | January 2004 | January 2004 | 0 |
| 6834649L5.7 | January 2004 | February 2004 | 0 |
| 6834649L5.7 | January 2004 | March 2004 | 0 |
| 6834649L5.7 | January 2004 | April 2004 | 0 |
| 6834649L5.7 | January 2004 | May 2004 | 0 |
| 6834649L5.7 | January 2004 | June 2004 | 0 |
| 6834649L5.7 | January 2004 | July 2004 | 0 |
| 6834649L5.7 | January 2004 | August 2004 | 0 |
| 6834649L5.7 | January 2004 | September 2004 | 0 |
| 6834649L5.7 | January 2004 | October 2004 | 0 |
| 6834649L5.7 | January 2004 | November 2004 | 1 |
| 6834740L50 | June 2004 | October 2004 | 0 |
| 6834740L50 | June 2004 | November 2004 | 0 |
| 6834754L50.1 | April 2004 | April 2004 | 0 |
| 6834754L50.1 | April 2004 | May 2004 | 0 |
| 6834754L50.1 | April 2004 | June 2004 | 0 |
| 6834754L50.1 | April 2004 | July 2004 | 0 |
| 6834754L50.1 | April 2004 | August 2004 | 0 |
| 6834754L50.1 | April 2004 | September 2004 | 0 |

The data in Table 5 is fed successively through computer implemented processes 16, 18, 20, 22, and 24 to create Age.func 26, Period.func 28, and Cohort.func 30. These functions for the example data set are shown in FIGS. 3, 4, & 5.

For computed implemented Forecasting 34 and Stress Testing 36 processes, the macroeconomic factors as illustrated in Table 6 were correlated to the Period.func 28 using appropriate transformations.

TABLE 6

The last year of macroeconomic data used to correlate to the Period.func 28.

| | | | |
|---|---|---|---|
| October 2011 | −2.512306 | 288.44 | 61 |
| November 2011 | −2.526809 | 288.44 | 63 |
| December 2011 | −2.526809 | 288.44 | 66 |
| January 2012 | −2.556366 | 285.80 | 82 |
| February 2012 | −2.586689 | 285.80 | 70 |
| March 2012 | −2.586689 | 285.80 | 82 |
| April 2012 | −2.602153 | 285.28 | 74 |
| May 2012 | −2.586689 | 285.28 | 66 |
| June 2012 | −2.556366 | 285.28 | 101 |
| July 2012 | −2.497979 | 287.54 | 80 |
| August 2012 | −2.483824 | 287.54 | 63 |
| September 2012 | −2.512306 | 287.54 | 107 |

The coefficients in Table 7 show how the macroeconomic data of Table 6 was transformed via moving averages or log-ratios and then included in a regression model to predict the Period.func 28.

TABLE 7

The coefficients from fitting the Period.func 28 to macroeconomic factors.

| | Estimate | Std. Error | t value | $Pr(>|t|)$ |
|---|---|---|---|---|
| (Intercept) | 5.908513 | 1.250051 | 4.727 | 3.31E−06 |
| t | −0.009547 | 0.002535 | −3.765 | 0.000195 |
| Unemp.lwMovingAvg.Lm6.W3 | 2.050558 | 0.535645 | 3.828 | 0.000153 |
| HPI.lwLogRatio.L5.W24 | −2.262367 | 1.039257 | −2.177 | 0.030153 |
| Housing.Starts.lwLogRatio.L8.W15 | −0.306789 | 0.047639 | −6.44 | 3.94E−10 |

Figure 6:
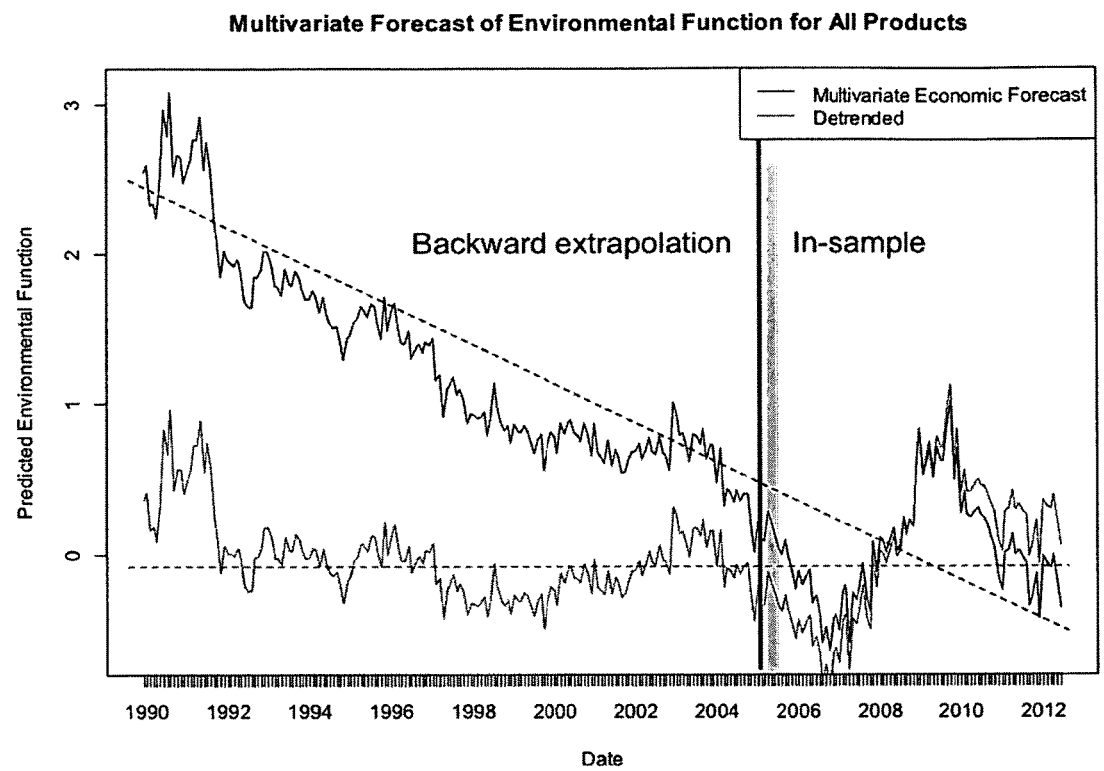
FIG. 6 is the Period.func (period) detrended performed as part of either the computer implemented forecasts or computer implemented stress tests

As part of the computer implemented Forecasting and Stress Testing processes, the model was extrapolated backward through previous recessions to produce the strongly trended line in FIG. 6. By fitting a straight line to through the trended function, the detrended function was produced and the Age.func 26 and Cohort.func 30 could be re-estimated.

The final stage was to estimate a scoring model as in computer implemented Scoring 32 process by adding scoring variables to the data set, Table 8.

TABLE 8

A sample of rows from a scoring data set showing the inclusion of the offset = Age.func(age) + Period.func(period) and additional scoring variables needed to predict Default.

| Loan.ID | Offset | Open.Score | Subcategory | LTV | Default |
|---|---|---|---|---|---|
| 7754505L5.2 | −6.507542 | 775 | Used | 0.8522903 | 0 |
| 7634427L50 | −6.257507 | 642 | New | 0.4283833 | 0 |
| 7664863L51 | −6.246894 | 707 | Used | 0.6147171 | 0 |
| 7774049L5 | −6.608102 | 717 | Used | 0.9218893 | 0 |
| 7747162L50 | −6.459596 | 704 | New | 0.8453044 | 0 |
| 7723509L5.1 | −5.981274 | 676 | Used | 0.8679208 | 0 |
| 7729144L51 | −6.176326 | 651 | Used | 1.0482788 | 1 |
| 7747267L5 | −5.874071 | 800 | Used | 0.7239003 | 0 |
| 13229051L50 | −6.247366 | 788 | New | 0.182804 | 0 |

TABLE 8-continued

A sample of rows from a scoring data set showing the inclusion of the offset = Age.func(age) + Period.func(period) and additional scoring variables needed to predict Default.

| Loan.ID | Offset | Open.Score | Subcategory | LTV | Default |
|---|---|---|---|---|---|
| 7750571L51 | −6.565326 | 744 | Used | 0.6692575 | 0 |
| 7596305L5 | −6.242031 | 628 | Used | 0.7948481 | 0 |
| 7718049L5 | −6.223141 | 664 | Used | 0.1975557 | 0 |
| 7732553L50 | −6.40514 | 663 | New | 1.0088621 | 0 |
| 7396413L51 | −6.565326 | 690 | Used | 1.2357388 | 0 |
| 7720485L5 | −6.284591 | 576 | Used | 0.5254888 | 0 |
| 7693108L50 | −6.45063 | 707 | New | 1.0189697 | 0 |
| 7585987L5.2 | −6.202212 | 642 | Used | 0.6931909 | 0 |
| 7616423L5.2 | −6.573594 | 712 | Used | 0.3008851 | 0 |
| 7052013L5.3 | −6.436005 | 770 | Used | 0.7303952 | 0 |
| 7052013L5.4 | −6.750255 | 714 | Used | 1.2616333 | 0 |
| 7345208L50.1 | −7.065701 | 696 | New | 0.9836364 | 0 |
| 7744971L51 | −7.213443 | 777 | Used | 0.8429142 | 0 |
| 7705526L51 | −6.581321 | 650 | Used | 0.7681351 | 0 |

The data in Table 8 was analyzed as object "perf" with a standard generalized linear model (GLM). In R, this takes the form, model <-glm("Default~1+offset(Offset)+Open.Score+Subcategory+Source+log(LTV)", family=binomial, data=perf)

The output from the GLM is given in Table 9. The predict ( ) function implemented in R can be applied with future values for Offset to realize the computer implemented Scoring 32 process.

TABLE 9

Output coefficients from the glm score using an Offset = Age.func + Period.func.

| | Estimate | Std. Error | z value | $Pr(>|z|)$ |
|---|---|---|---|---|
| (Intercept) | 10.306961 | 1.367256 | 7.538 | 4.76E−14 |
| Open.Score | −0.012886 | 0.00183 | −7.043 | 1.88E−12 |
| log(LTV) | 1.203598 | 0.546832 | 2.201 | 0.0277 |
| SubcategoryNew | 0 | | | |
| Subcategory Used | 0.133842 | 0.312062 | 0.429 | 0.668 |

The computer implemented scoring 30 process is combined with the results of the computer implemented forecasting 34 process or computer implemented stress testing 36 process to create account-level forecasts or stress tests.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A machine for estimating the future behavior of accounts, in which the machine incorporates an offset that improves the robustness and stability out of sample and results in a system that is better able to predict the probability of events for longer periods of time than known systems, the machine comprising:
   a computer system for receiving and processing account data for a plurality of individual accounts, which includes at least two of the three values of the account origination date (cohort), observation date that said accounts were observed for each account (period) and the age of each of said accounts (age);
   an engine for receiving and processing said account data and providing estimates of one or more of three parametric functions of age, period and cohort:
   wherein said computer system is configured to use said parametric functions to predict the behavior of said accounts using parametric functions of age and period to compute account-level offsets and creating scores of account specific behavior using the account-level offsets in order to predict the account behavior with increased stability for longer periods of time and enabling the system to be used for a broader range of applications, and
   wherein said engine is configured to utilize orthonormal basis functions for estimating any of said parametric functions, wherein only one of said basis functions includes a constant term and only two of the basis functions include linear terms.

2. The machine as recited in claim 1, wherein said engine utilizes orthonormal basis functions for estimating said functions, wherein said basis functions include constant and linear terms.

3. The machine as recited in claim 1, wherein said engine utilizes spline basis functions for estimating said functions, wherein said spline functions have a total of one constant term and two linear terms.

4. The machine as recited in claim 1, wherein said engine utilizes non-parametric functions for estimating said functions of age, period and cohort, wherein said non-parametric functions have a total of one constant term and two linear terms.

5. The machine as recited in claim 1, wherein said engine takes into consideration a random effects term on the account number.

6. The machine as recited in claim 2, wherein said engine takes into consideration a random effects term on the account number.

7. The machine as recited in claim 3, wherein said engine takes into consideration a random effects term on the account number.

8. The machine as recited in claim 1, wherein said future behavior includes account response to stress testing.

9. The machine as recited in claim 1, wherein said engine is configured to compute an account-level offset for creating scores as a function of age and period functions.

10. The machine as recited in claim 1, wherein said engine is configured to stabilize the estimation of the period function and adjust the age and cohort functions to compensate based upon additional economic data.

11. The machine as recited in claim 1 wherein said engine is configured to create scores for each account based upon said account specific behavior.

12. The machine as recited in claim 1, wherein said engine utilizes parametric functions for estimating said functions of age, period and cohort.

13. The machine as recited in claim 1, wherein said engine is configured to forecast future behavior of said accounts using the parametric functions and historical macroeconomic data and wherein the engine is configured to use additional historical macroeconomic data to stabilize the estimation of the period function and adjust the age and cohort functions to compensate.

* * * * *